United States Patent [19]
Wood

[11] 4,176,553
[45] Dec. 4, 1979

[54] LIQUID LEVEL MEASURING SYSTEM
[75] Inventor: Tony J. Wood, Ann Arbor, Mich.
[73] Assignee: Ford Motor Company, Dearborn, Mich.
[21] Appl. No.: 971,974
[22] Filed: Dec. 21, 1978
[51] Int. Cl.$^2$ .......................................... G01F 23/26
[52] U.S. Cl. ................................ 73/304 C; 361/284
[58] Field of Search ............... 73/304 C; 361/284; 364/442

[56] References Cited
U.S. PATENT DOCUMENTS

| | | | |
|---|---|---|---|
| 3,279,253 | 10/1966 | Blackmon, Jr. et al. | 73/304 C |
| 3,349,301 | 10/1967 | Bell | 73/304 C |
| 3,620,080 | 11/1971 | Ryder | 73/304 C |
| 3,830,090 | 8/1974 | Hersch | 73/304 C |
| 3,862,571 | 1/1975 | Vogel | 73/304 C |
| 3,916,689 | 11/1975 | Donnelly | 73/304 C |
| 3,964,037 | 6/1976 | Lamphere | 73/304 C |
| 4,001,676 | 1/1977 | Hile et al. | 73/304 C |
| 4,059,016 | 11/1977 | Kitzinger et al. | 73/304 R |

*Primary Examiner*—Donald O. Woodiel
*Attorney, Agent, or Firm*—Paul K. Godwin, Jr.; Clifford L. Sadler

[57] ABSTRACT

A method and apparatus for measuring the level of a liquid in a storage tank having a predetermined reference level. A liquid level sensor is located in the tank so as to monitor the upper level of liquid over a predetermined height range at a plurality of locations within the tank. The sensor is interrogated at each location to determine the corresponding sensed level and the sensed levels are compared to see if their values are close enough to indicate that the measured level approximates a plane parallel to the predetermined reference level in the tank. Only when the sensed evels are close enough in value, is one of their level values read as a measure of the level in the tank.

20 Claims, 6 Drawing Figures

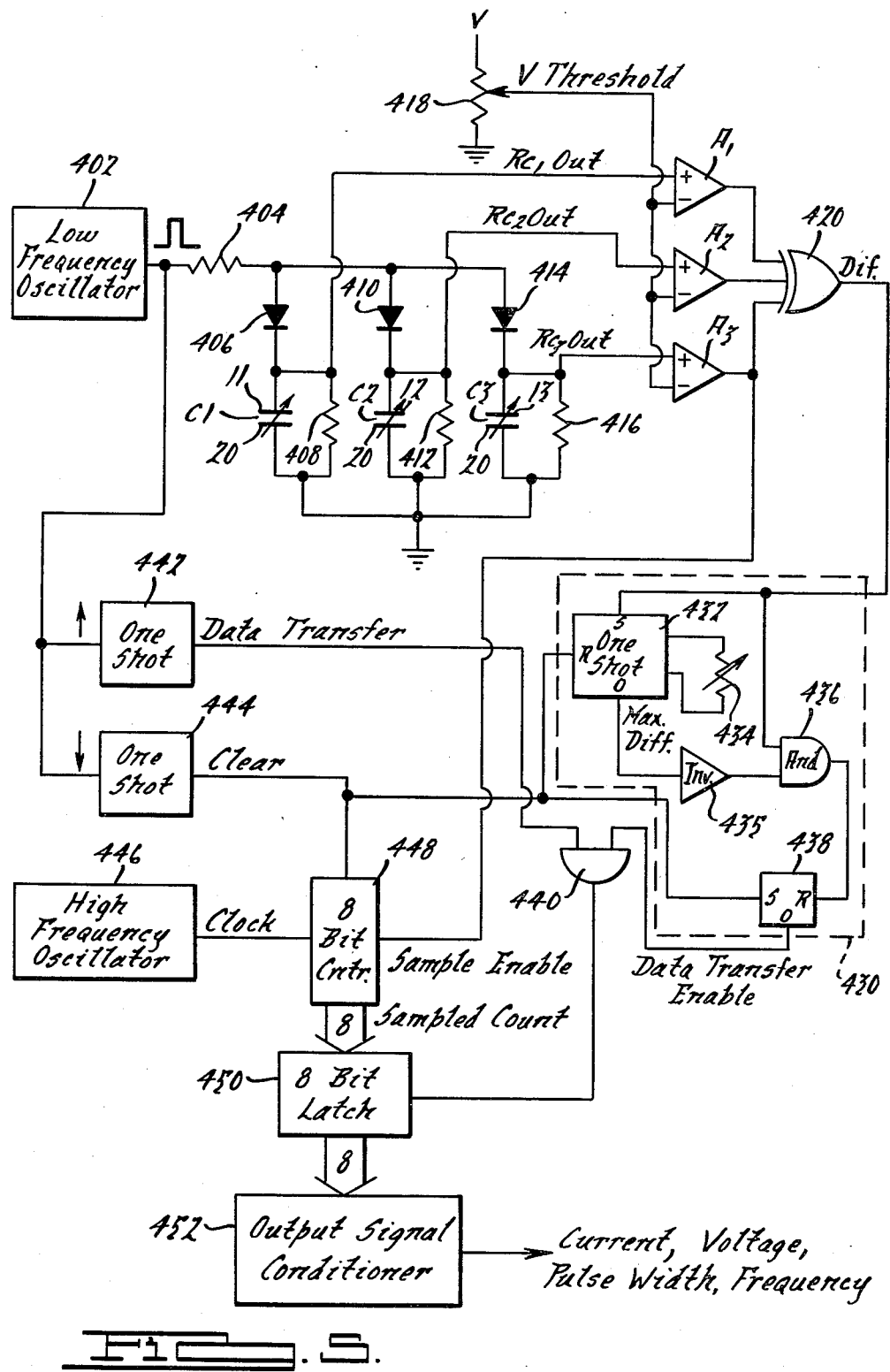

LIQUID LEVEL MEASURING SYSTEM

CROSS REFERENCE TO RELATED APPLICATION

The present invention is related to my commonly assigned, and contemporaneously filed U.S. patent application Ser. No. 971,751, entitled CAPACITIVE LIQUID LEVEL SENSOR, filed Dec. 21, 1978.

BACKGROUND OF THE INVENTION

1. Field of the Invention

The present invention is related to systems for measuring liquid levels within liquid storage tanks and more specifically to systems to electrically measure the quantity of fuel remaining in a vehicular fuel tank.

2. Description of the Prior Art

Although many techniques have been disclosed which could be used to measure the liquid levels in storage tanks, the most commonly used system for measuring fuel level in the fuel tank of a motor vehicle, employs a variable resistor within the tank. The wiper arm of the variable resistor is connected through a pivot to a float which monitors the upper level of the fuel in the tank. Of course, whenever the vehicle is traveling on a grade, the fuel level is shifted at an angle to the normally horizontal reference plane of the fuel tank and causes the float to monitor an erroneous level, either higher or lower than the correct level. Additionally, when the vehicle starts or stops its motion, waves are generated in the stored fuel. This is commonly referred to as "sloshing" and causes the float to responsively bounce up and down, thereby effecting the measurement readings. Mechanical and electrical damping techniques have been employed to reduce the effects of fuel level shift and sloshing. However, they have not been shown to be suitable for obtaining instantaneous and accurate fuel level measurements.

SUMMARY OF THE INVENTION

The present invention overcomes the deficiencies in the prior art and is intended to provide accurate and instantaneous fuel level measurements whenever the fuel level is parallel to a predetermined reference level.

It is an object of the present invention to provide a system for accurately measuring the quantity of remaining liquid in a storage tank.

It is another object of the present invention to provide a system for accurately measuring the quantity of remaining liquid in a storage tank at a plurality of locations and updating a previous measurement only when the quantity readings at a plurality of locations differ from each other within a maximum predetermined amount.

It is a further object of the present invention to provide a system for accurately measuring quantity of remaining fuel in a storage tank only when the level of liquid in the tank is parallel to the predetermined reference level.

The present invention is intended as an improvement to conventional liquid level measurement systems and is broadly seen as suitable for use in all types of liquid storage tanks.

The invention includes a uniquely configured capacitive sensor which extends from the top of a liquid storage tank in a direction generally normal to the horizontal plane level that the liquid seeks. In the case of an automotive vehicle fuel tank, the horizontal plane is also used as the initial reference for calibrating quantity vs. height and the sensor is mounted so as to be normal to the horizontal. The capacitive sensor contains a plurality of capacitors with a cylindrical housing, that extend parallel to the length of the cylinder so as to contact the stored liquid throughout the range of levels to be monitored. The housing contains vent apertures to allow a portion of the stored liquid to enter the cylinder and function as a dielectric for the capacitors. Since the capacitors are identically configured they will exhibit equal values of capacitance only when the liquid dielectric between the plates of each capacitor covers equal areas. As a corollary, when the liquid in the tank is sloshing or has its level disoriented with respect to the reference plane of the tank, the fluid functioning as a dielectric will cover different areas of the capacitors and they will exhibit dissimilar values of capacitance.

The sensor housing is described as being cylindrical and includes such cross-sectional configurations as "Y," triangular or circular. The preferred requirements for any cross-sectional configurations are that they be adaptable for a plurality of capacitors to be mounted along the cylinder length; monitor the liquid level in a plurality of locations along the range of levels to be monitored; and provide narrow passages that resist sloshing of the dielectric.

The sensor capacitor plates monitor liquid levels at the separate locations and associated circuitry interrogates these sensor capacitors to derive output pulses characteristic of their respective capacitance values (liquid level). As a result of interrogation, pulses having corresponding pulse widths are produced and are compared to derive the largest difference therebetween. The largest difference is then compared with a predetermined maximum difference value. If the maximum difference value is greater, the capacitance values of the sensor capacitors are considered to be close enough for the system to read any one of them and determine the quantity of liquid remaining in the tank. Hence, an enabling signal is generated and one of the pulses from a sensor capacitor is read to determine the liquid level.

In contrast, if the maximum difference value is less, the capacitance values of the sensor capacitors differ so greatly as to indicate that the liquid is not level with the predetermined reference plane, possibly due to slosh, centrifugal disorientation or because the vehicle is on a steep grade. In that case, no enabling signal is generated and no measurement of the quantity of liquid remaining in the tank is made, since such a measurement would most likely be inaccurate. Therefore, the system holds the preceding quantity measurement until an enabling signal is generated and a new reading is made.

BRIEF DESCRIPTION OF THE DRAWINGS

FIG. 5 is a schematic/block diagram of circuitry employed in the liquid level measuring system of the present invention.

DESCRIPTION OF THE PREFERRED EMBODIMENTS

Figure 1:
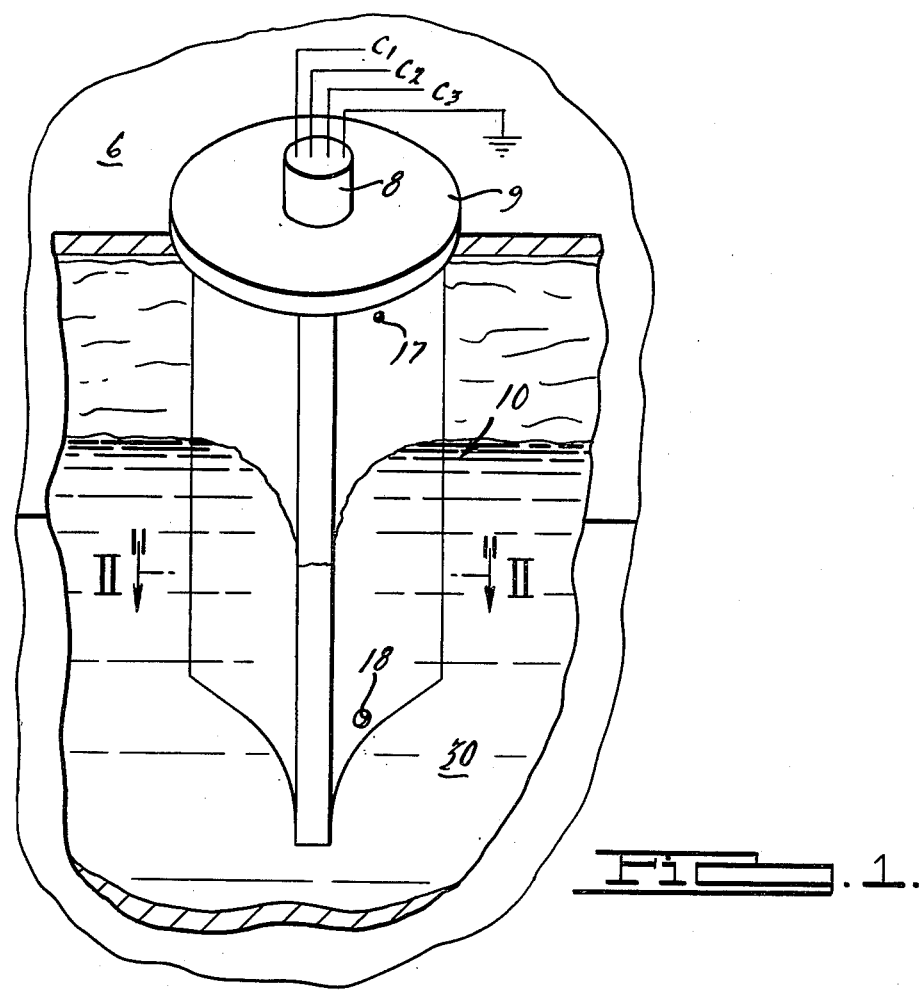
FIG. 1 is a cut-away view of a liquid storage tank in which a capacitive type liquid level sensor of the present invention is mounted.
Figure 2:
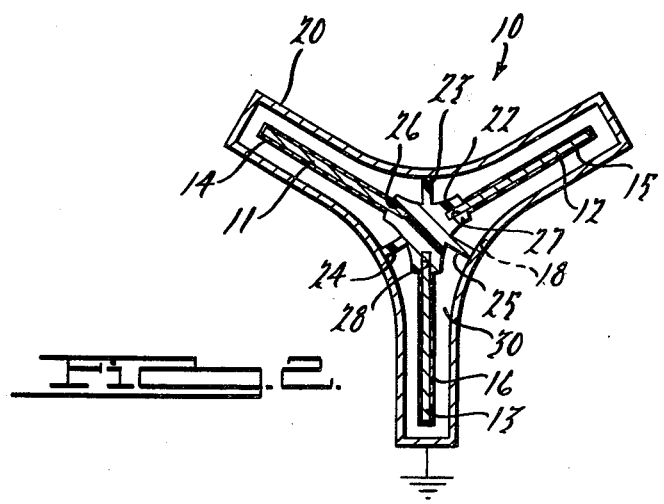
FIG. 2 is a cross-sectional view of the sensor shown in FIG. 1.

A capacitive type liquid level sensor 10 is shown in FIGS. 1 and 2 as being installed on a liquid storage tank 6 containing a quantity of liquid 30. The liquid level sensor 10 includes a cylindrical housing 20 which extends along a line normal to the expected level of the liquid 30. Since, in a static condition, liquid seeks its own level parallel to a horizontal plane, the cylindrical housing 20 is mounted normal to that plane.

Vent apertures 17 and 18 are located near the uppermost and lowermost ends of the cylindrical housing 20 so as to allow the liquid 30 to enter the housing and seek a level therein equal to the level of the liquid within the tank. The housing 20 has a "Y" cross-sectional configuration, and contains a plurality of electrically conducting capacitive plates 11, 12, and 13. Each of the capacitive plates 11, 12, and 13 extend in a corresponding arm of the housing 20 so as to monitor liquid levels at separate locations. The capacitive plates 11, 12, and 13 are centrally mounted from an insulating member 22 in respective slots 26, 27, and 28. The central mounting member 22 also includes three arms 23, 24, and 25 which extend to the inner walls of the housing 20 and provide both rigid mounting and continuous spacing of the plates from the housing.

In the instant example, the capacitive liquid sensor is shown as employed in an automotive fuel tank and is termed a "fuel sender." Normally, the liquid 30 (fuel) acts as a dielectric between the respective plates 11, 12, and 13 and the common housing 20. However, since conductive moisture is known to enter and be mixed with fuel, the plates are coated with an insulating film as indicated at 14, 15, and 16. This film is quite thin as compared to the spacing between the plates and the housing and has negligible effect on the capacitance values for the changing air/fuel dielectric levels.

In a system wherein it is desired to measure the quantity of liquid remaining in a liquid storage tank 6 over the entire vertical height of the tank, the cylindrical housing 20, as well as the capacitive plates 14, 15, and 16 will coextend from the top of the desired measuring range to the bottom of the desired measuring range.

Figures 3, 4:
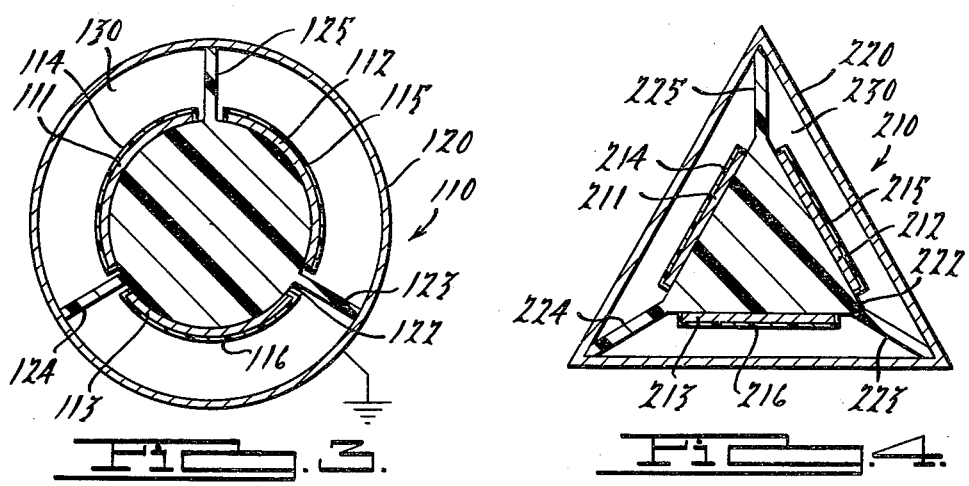
FIG. 3 is a cross-sectional view of an alternative capacitive type liquid level sensor.
FIG. 4 is a cross-sectional view of another alternative capacitive type liquid level sensor.

An alternative cylindrical capacitive sensor 110 is shown in FIG. 3, wherein the cross-section of the sensor is circular. In that alternative sensor 110, a cylindrical housing 120 is made of an electrically conductive material. A concentric core 122 is made of an insulative material and serves as a support for a plurality of capacitive plates 111, 112, and 113 which monitor the liquid level at separate locations within the housing 120. Spacer legs 123, 124, and 125 are made of an insulative material like that of the central core 122 and extend between the central core 122 and the outer housing 120 to provide rigid support and continuous separation between the plates 112, 113, and 114 from the housing 120. As in the embodiment shown in FIGS. 1 and 2, an insulative protective film is indicated as 114, 115, and 116 on the respective capacitive plates 111, 112, and 113.

Another alternative cross-sectional configuration of the capacitive liquid level sensor is shown in FIG. 4 wherein the sensor 210 is indicated as having a triangular cross section. In this system, a cylindrical housing 220 has a triangular configuration and contains therein a plurality of capacitive plates 211, 212, and 213. The plates are continuously spaced from the housing 220 and function as capacitors which sense the liquid level 230 at separate locations within the housing 220. Spacer legs 223, 224, and 225 function to support and maintain the central core 222 in a rigid position. The plates 211, 212, and 213 are mounted on the central core 222 and are shown with insulative protective films 214, 215, and 216, respectively.

Each of the above described embodiments of a capacitive type liquid level sensor, is characterized in that the outer cylindrical housing serves as a common plate for each capacitor and that each of the internal plates have identical conductive surface areas identically separated with respect to the cylindrical housing. Therefore, when the level of the dielectric portion of the liquid is covering equal areas of the internal capacitive plates, the capacitance values of the plurality of capacitors will be exactly the same. On the other hand, if each capacitor has a different air/liquid dielectric ratio, then their respective capacitance values will be different.

An electrical connector 8 is shown in FIG. 1 having a plurality of electrical wires designated as $C_1$, $C_2$, and $C_3$. These serve to respectively connect capacitive plates 14, 15, and 16 to circuitry shown in FIG. 5. A fourth wire is designated a ground connection which extends to the housing 20.

The circuit shown in FIG. 5 functions to interrogate each of the capacitors in the capacitive liquid level sensor to derive separate signals indicative of liquid levels from each of the capacitors. The circuit compares the sensed levels at the several locations to derive a difference signal. The circuit then compares the difference signal with a predetermined maximum difference signal value to determine if the sensed levels correspond to each other within a predetermined allowable difference. The predetermined allowable difference is set during system calibration to determine the maximum allowable discrepancy between sensor readings. If the measured discrepancy is within the maximum allowable amount, an enabling signal is generated which allows one of the liquid level sensing capacitors to be read. Its read value then is indicative of the quantity of liquid remaining in the storage tank.

A low frequency oscillator 402 generates square wave pulses which are used both for interrogation and cycle clocking. The output of the low frequency oscillator used for interrogation is fed to resistor 404 and through parallel connected diodes 406, 410, and 414.

The cathode of the diode 406 is connected to plate 11 of liquid level sensing capacitor $C_1$, to one terminal of a resistor 408 and to a positive input terminal of operational amplifier $A_1$. The opposite plate 20 of liquid level sensing capacitor $C_1$ and the other terminal of resistor 408 are commonly connected to ground.

The cathode of diode 410 is connected to plate 12 of liquid level sensing capacitor $C_2$, to one terminal of a resistor 412 and to a positive input terminal of operational amplifier $A_2$. The opposite plate 20 of liquid level sensing capacitor $C_2$ and the other terminal of resistor 412 are commonly connected to ground.

The cathode of diode 414 is connected to plate 13 of liquid level sensing capacitor $C_3$, to one terminal of a resistor 416 and to a positive input terminal of operational amplifier $A_3$. The opposite plate 20 of liquid level sensing capacitor $C_3$ and the other terminal of resistor 416 are commonly connected to ground.

Figure 6:
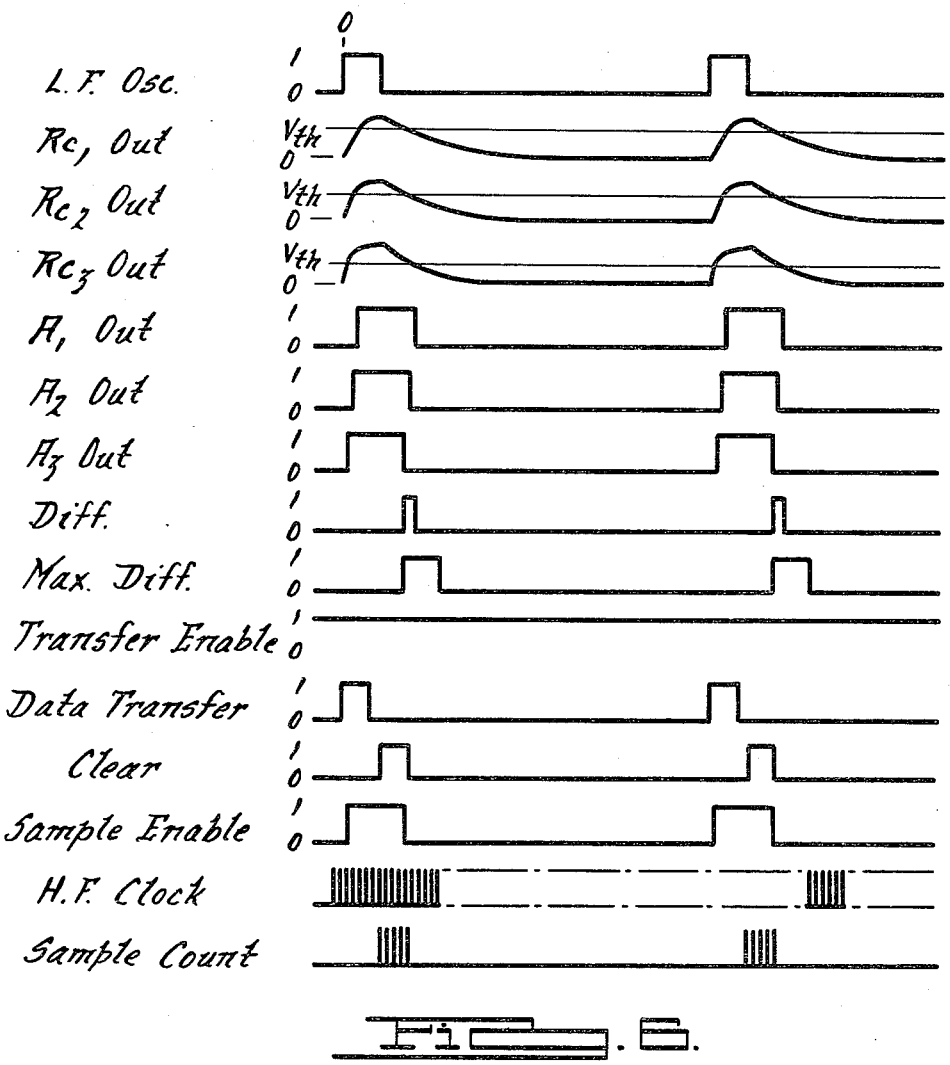
FIG. 6 is a plot of various signal levels as they may sequentially occur in the circuit shown in FIG. 5.

The leading edge of the positive going interrogation pulse from the low frequency oscillator across resistor 404 is simultaneously conducted through the parallel connected forward biased diodes 406, 410, and 414 and causes the respective capacitors $C_1$, $C_2$, and $C_3$ to charge at rates corresponding to their respective capacitance values and the relatively low resistance value of the commonly connected resistor 404. For illustration purposes, the capacitance values of liquid sensing capacitors $C_1$, $C_2$, and $C_3$ are shown to be slightly different. For instance, the capacitance value of capacitors $C_1$ is shown as being higher than capacitor $C_2$ and the capacitance value of capacitor $C_2$ is shown as being higher than the value of capacitor $C_3$. Therefore, the relative charge rates are shown in FIG. 6 as being slightly higher for the lesser capacitance values.

The negative input terminals of respective operational amplifiers $A_1$, $A_2$, and $A_3$ are commonly connected to a threshold voltage $V_{th}$ through a preset variable voltage divider 418. When the respective liquid level sensing capacitors are charged to a value equal to the threshold value, the output of their corresponding operational amplifiers change from low level to high level outputs, as indicated in FIG. 6. Similarly, when the capacitors discharge below the preset threshold level, the outputs of the respective operational amplifiers return to a normally low level output.

Discharge of the liquid level sensing capacitors simultaneously starts to occur when the output pulse from the low frequency oscillator 402 goes from a high level to a low level. At that instant, the diodes 406, 410, and 414 become reverse biased and block current flow. The respective level sensing capacitors $C_1$, $C_2$, and $C_3$ simultaneously commence discharging through their associated resistors 408, 412, and 416. Resistors 408, 412, and 416 are of equal value which is relatively high in comparison to the value of resistor 404. Therefore, the sensing capacitors $C_1$, $C_2$, and $C_3$ discharge at rates which differ only according to the differing capacitance values. It can also be seen that the outputs of the respective operational amplifiers $A_1$, $A_2$, and $A_3$ will be in the form of high level pulses as long as the associated sensing capacitor is charged to a level at or above the preset threshold level. Those high level pulses then have pulse width values according to the capacitance values of their respectively associated liquid level sensing capacitor.

The outputs of the operational amplifiers $A_1$, $A_2$, and $A_3$ are compared in an exclusive OR gate 420 which produces a DIFF output pulse having a width corresponding to the time between the first occurring and the last occurring output pulses from the operational amplifiers $A_1$, $A_2$, and $A_3$. The measurable time difference occurs during the discharge of the capacitors and, therefore, the DIFF signal output from the exclusive OR gate 420 is essentially a measurement of the time difference between the first occurring trailing edge of an output signal from one of the operational amplifiers $A_1$, $A_2$, and $A_3$, and the last occurring trailing edge. The DIFF signal from the exclusive OR gate 420 is then fed to a pulse width comparator 430 where it is compared with a maximum difference value signal MAX DIFF to determine if the outputs of the operational amplifiers $A_1$, $A_2$, and $A_3$ have pulse widths which are close enough to be considered identical. The DIFF signal is fed to the set input of a one shot multi-vibrator 432, within the pulse width comparator 430. The one shot multi-vibrator 432 contains a preset variable resistor 434 which sets the width of the output pulse therefrom. This output pulse is used as the MAX DIFF signal. The MAX DIFF signal is inverted by an inverter 435 and fed to one input of an AND gate 436. The inverted MAX DIFF signal is ANDed with the DIFF signal from the exclusive OR gate 420. Therefore, when the DIFF signal has a width less than the inverted MAX DIFF signal, the output of the AND gate 436 is at a low level and when the DIFF signal pulse width exceeds the inverted MAX DIFF signal, the AND gate 436 outputs a high level signal, which is fed to the reset input of a bistable multi-vibrator 438.

A one shot multi-vibrator 444 receives cycle clocking pulses from the low frequency oscillator 402 and responds to the trailing edge of that signal. The output of the one shot multi-vibrator 444 is termed a "CLEAR" signal and is connected to a set input of the multi-vibrator 438 as well as a reset input of the one shot multi-vibrator 432.

The low frequency oscillator 402 is also connected to supply cycle clocking pulses to a one shot multi-vibrator 442. The one shot multi-vibrator 442 responds to the leading edge of the cycle clocking pulse and produces a DATA TRANSFER pulse to one of the inputs to an AND gate 440. The AND gate 440 is enabled by the DATA TRANSFER ENABLE signal output of the multi-vibrator 438, when it is not reset.

Reading of the liquid level is accomplished by monitoring one of the operational amplifier outputs. In this case, operational amplifier $A_3$ output is termed a SAMPLE ENABLE signal and is connected to an 8-bit counter 448 to enable that counter to sample a series of high frequency oscillator CLOCK pulses from oscillator 446. The leading edge of the CLEAR signal from one shot multi-vibrator 444 resets the 8-bit counter 448 to zero and therefore allows the counter to sample CLOCK pulses only during the discharge portion of the SAMPLE ENABLE signal. The output of the 8-bit counter 448 contains a SAMPLE COUNT and is fed into an 8-bit latch 450, when the output from the AND gate 440 is at a high level and prior to the next sample cycle. Thus, it can be seen that the 8-bit latch 450 is updated with a new sample count whenever the DATA TRANSFER ENABLE signal and the DATA TRANSFER signal are present. The contents of the 8-bit latch 450 are then sensed by an output signal conditioner 452 where the value is converted to either a current, voltage, a pulse width, or a frequency, indicative of the measure of liquid remaining in the storage tank. The conversion product, of course, is a matter of choice dependent upon the particular application of the present invention. Applications such as fuel consumption per distance traveled measurements, fuel consumption per time measurements, quantity of fuel remaining measurements, and distance till empty measurements are all possible and more accurately obtainable due to the contributions offered by the present invention.

It will be apparent that many modifications and variations may be effected without departing from the scope of the novel concept of this invention. Therefore, it is intended by the appended claims to cover all such modifications and variations which fall within the true spirit and scope of the invention.

I claim:

1. A system for measuring liquid within a tank having a known configuration and referential orientation comprising:

means for sensing the level of said liquid at a plurality of locations in said tank;

means for interrogating said sensing means to derive a separate value signal of said liquid level from each of said plurality of locations;

means for sampling said separate value signals of liquid level and measuring differences between each of said separate value signals;

means responsive to one of said separate value signals and said measured differences for producing a liquid level output signal only when said measured differences are below a predetermined amount.

2. A system as in claim 1, wherein said liquid is a fuel and said tank is mounted on a fuel powered vehicle, and further wherein said sensing means comprises at least two fuel senders which monitor the fuel level at separate locations.

3. A system as in claim 2, wherein each of said fuel senders comprise an electrical capacitor fixedly mounted in said tank to have values of capacitance corresponding to a range of monitored fuel levels in said tank.

4. A system as in claim 3, wherein each capacitor includes two conducting plates rigidly mounted on said tank in a predetermined orientation so as to extend transverse to the range of liquid levels to be monitored.

5. A system as in claim 4, wherein the capacitors are all parallel to each other and extend equally through the range of liquid levels to be monitored.

6. A system as in claim 5, wherein said fuel senders have a cylindrical shaped housing which has one end mounted on a predefined top of said tank and extends into said tank so as to present a continuous cross-section to said liquid level throughout the monitored range and further wherein said housing is employed as one of said conducting plates.

7. A system as in claim 6, wherein the second conducting plates of each capacitor are mounted within said housing and equally extend continuously spaced from said housing over the length of said monitored range.

8. A system as in claim 7, wherein said second conducting plates are insulated from one another and said housing is a common first plate for all said capacitors.

9. A system as in claim 8, wherein said interrogating means includes:

means for generating an electrical pulse having a known amplitude and pulse width;

means for applying said pulse to each of said second conducting plates; and means for providing a like resistive electrical discharge path for each capacitor.

10. A system as in claim 9, wherein said interrogating means further includes means connected to each capacitor to produce separate value signals to correspond to each capacitor being charged above a predetermined voltage.

11. A system as in claim 10, wherein said sampling means includes an exclusive OR gate connected to receive said separate value signals from said interrogating means for producing an output pulse having a width corresponding to the difference between the greatest and smallest of said separate value signals.

12. A system as in claim 11, wherein said responsive means includes:

means for comparing said sampling means output pulse width with a predetermined pulse width value and producing an enabling signal whenever said sampling means output pulse is less than said predetermined pulse width value; and means connected to receive one of said separate value signals to convert the width of that signal to a liquid level output signal.

13. A system as in claim 3, wherein said interrogating means includes:

means for generating an electrical pulse having a known amplitude and pulse width;

means for applying said pulse to each of said second conducting plates; and means for providing a like resistive electrical discharge path for each capacitor.

14. A system as in claim 13, wherein said interrogating means further includes means connected to each capacitor to produce separate value signals to correspond to each capacitor being charged above a predetermined voltage.

15. A system as in claim 14, wherein said sampling means includes an exclusive OR gate connected to receive said separate value signals from said interrogating means for producing an output pulse having a width corresponding to the difference between the greatest and smallest of said separate value signals.

16. A system as in claim 15, wherein said responsive means includes:

means for comparing said sampling means output pulse width with a predetermined pulse width value and producing an enabling signal whenever said sampling means output pulse is less than said predetermined pulse width value; and means connected to receive one of said separate value signals to convert the width of that signal to a liquid level output signal.

17. A system for measuring the quantity of remaining fuel in a vehicular fuel storage tank over a predetermined range of levels when the upper level of said remaining fuel is approximately parallel with a predetermined reference plane, comprising:

means for sensing the upper level of said remaining fuel at a plurality of locations throughout said predetermined range;

means for comparing said sensed levels at said locations to derive a difference signal;

means for comparing said difference signal with a predetermined maximum difference signal value to determine if said sensed levels correspond to each other within a predetermined allowable difference and generating an enabling signal when said difference signal is allowable; and means responsive to said enabling signal for converting one of said sensed levels to a remaining fuel quantity measurement.

18. A system as in claim 17, wherein said predetermined reference plane is generally parallel with the horizontal;

said sensing means includes electrical capacitors having plates at each location extending perpendicular to said horizontal; and said capacitors have dielectrics comprising air and a portion of said remaining fuel.

19. A method of measuring the quantity of remaining fuel in a vehicular fuel storage tank over a predetermined range of levels when the upper level of said remaining fuel is approximately parallel with a predetermined reference plane including the steps of:

sensing the upper level of said remaining fuel at a plurality of locations;

comparing said sensed levels at said locations to derive a difference signal;

comparing said difference signal with a predetermined maximum difference signal value to determine if sensed levels correspond to each other within a predetermined allowable difference;

generating an enabling signal when said difference signal is allowable; and responding to said enabling signal to convert one of said sensed levels to a remaining fuel quantity measurement.

20. A method as in claim 19, wherein said predetermined reference plane is defined as being generally parallel with the horizontal and said step of sensing is performed at said locations by utilizing electrical capacitors having plates which extend perpendicular to said horizontal and dielectrics comprising air and a portion of the remaining fuel.

* * * * *